United States Patent

Chen

[11] Patent Number: 5,831,455
[45] Date of Patent: Nov. 3, 1998

[54] POLARITY DETECTOR

[75] Inventor: Yung-Jann Chen, Taipei, Taiwan

[73] Assignee: Motorola, Inc., Schaumburg, Ill.

[21] Appl. No.: 632,295

[22] Filed: Apr. 15, 1996

[51] Int. Cl.$^6$ .................................................. G01R 19/00
[52] U.S. Cl. ........................... 327/28; 327/30; 340/146.2
[58] Field of Search ........................ 340/146.2; 327/28, 327/29, 30, 171, 91, 94

[56] References Cited

U.S. PATENT DOCUMENTS

| | | | |
|---|---|---|---|
| 4,551,031 | 11/1985 | Ishikawa et al. | 340/146.2 |
| 4,748,438 | 5/1988 | Mickeal | 340/146.2 |
| 4,797,652 | 1/1989 | Hall | 340/146.2 |
| 5,365,527 | 11/1994 | Honma | 340/146.2 |

Primary Examiner—Toan Tran
Attorney, Agent, or Firm—Robert D. Atkins

[57] ABSTRACT

A polarity detector 100 wherein bistables 105 and 107 selectively sample the sequence of pulses and store samples. The samples and the output signal 125, stored by the bistable 109, are compared by the logic circuit 108. When the stored samples have identical polarity and the polarity of the output signal 125 is not identical to the polarity of the samples, then the polarity of the output signal 125 is changed to the polarity of the samples. However, when the polarity of the samples and that of the output signal 125 are not identical, then the polarity of the output signal 125 remains unchanged. In addition, when the polarity of the stored samples are not identical, the polarity of the output signal 125 remains unchanged. Hence, the polarity of the output signal 125 indicates the polarity of the sequence of pulses 120.

9 Claims, 4 Drawing Sheets

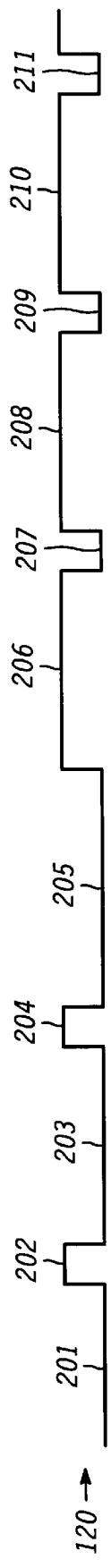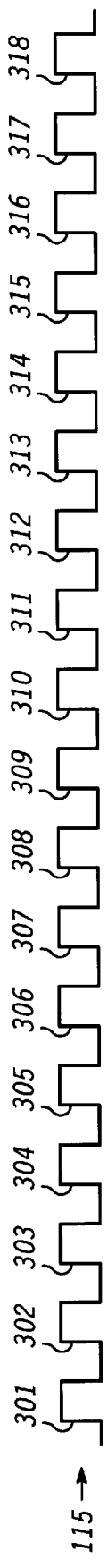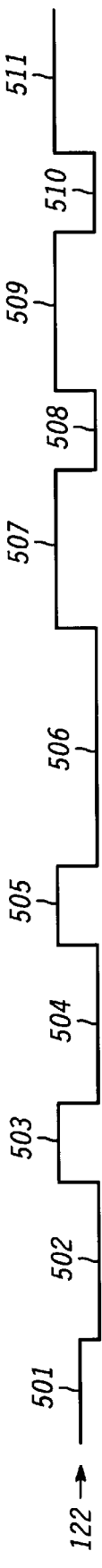

POLARITY DETECTOR

FIELD OF THE INVENTION

The invention relates in general to a polarity detector. The invention is particularly useful for, but not necessarily limited to detecting the polarity of a sequence of synchronising pulses in a computer monitor.

BACKGROUND OF THE INVENTION

In a computer monitor vertical and horizontal synchronising pulses determine the timing that ensure a display on the monitor is accurately reproduced. To accomplish this, circuitry in the computer monitor need to detect the polarity of the vertical and horizontal synchronising pulses.

A conventional analogue method for detecting the polarity of the synchronising pulses is to use a resistor-capacitor (R/C) integrator circuit that averages synchronising pulses over a predetermined period of time. The polarity of the synchronising pulses is then determined from the magnitude of the average. However, because of the relatively large values of the resistor and capacitor that are required, it is difficult to fabricate the resistor and the capacitor on a semiconductor chip. Therefore, this limits the ability to integrate this type of polarity detector in a digital computer monitor controller chip. A conventional digital method for detecting the polarity of the synchronising pulses is to use counters and comparators. However, although this type of digital polarity detector can be integrated in a digital computer monitor controller chip, the relatively large number of components results in the increase of current drain, chip real estate and speed of operation, which may not be adequate for some applications of the controller chip.

SUMMARY OF THE INVENTION

It is an object of this invention to overcome or alleviate at least one of the problems associated with prior art polarity detectors.

According to one aspect of this invention there is provided a polarity detector comprising: a storage means for selectively sampling and storing a sequence of at least 2 pulses; and a digital comparator means coupled to outputs of the storage means to compare the samples to provide an output signal, wherein, in use, changes in the output signal are dependent upon the polarity thereof and the samples being identical in polarity, and wherein when the samples differ in polarity the output signal remains unchanged.

Preferably, the storage means may have a clock input for effecting the storing.

Suitably, the storage means may comprise at least two bistables.

The digital comparator may comprise an output signal storage means for storing the output signal. The output signal storage means may be coupled to the clock input of the storage means for effecting storage of the output signal upon receipt of a clock pulse.

Preferably, the digital comparator may comprise a logic circuit adapted to receive the stored output signal for comparing the samples therewith.

According to another aspect of the invention, there is provided a method for detecting polarity of a sequence of pulses, the method comprising the steps of:

a) selectively sampling and storing samples of the pulses; and b) comparing the samples to provide an output signal indicative of he samples being identical in polarity.

Preferably, the step of selectively sampling and storing (a) may be effected by a clock signal.

Suitably, the step of comparing (b) may further comprise the step of storing the output signal for at least one cycle of the clock signal.

Preferably, the step of comparing (b) may further comprise the step of comparing the samples and the output signal.

BRIEF DESCRIPTION OF THE DRAWING

FIGS. 2–8 illustrate timing waveforms of the polarity detector in FIG. 1 in accordance with the preferred embodiment of the present invention.

DETAILED DESCRIPTION OF THE INVENTION

In the following description, logic 0 and logic 0 state refers to a pulse or sample having a negative polarity, and logic 1 and logic 1 state refers to a pulse or sample having a positive polarity.

Figure 1:
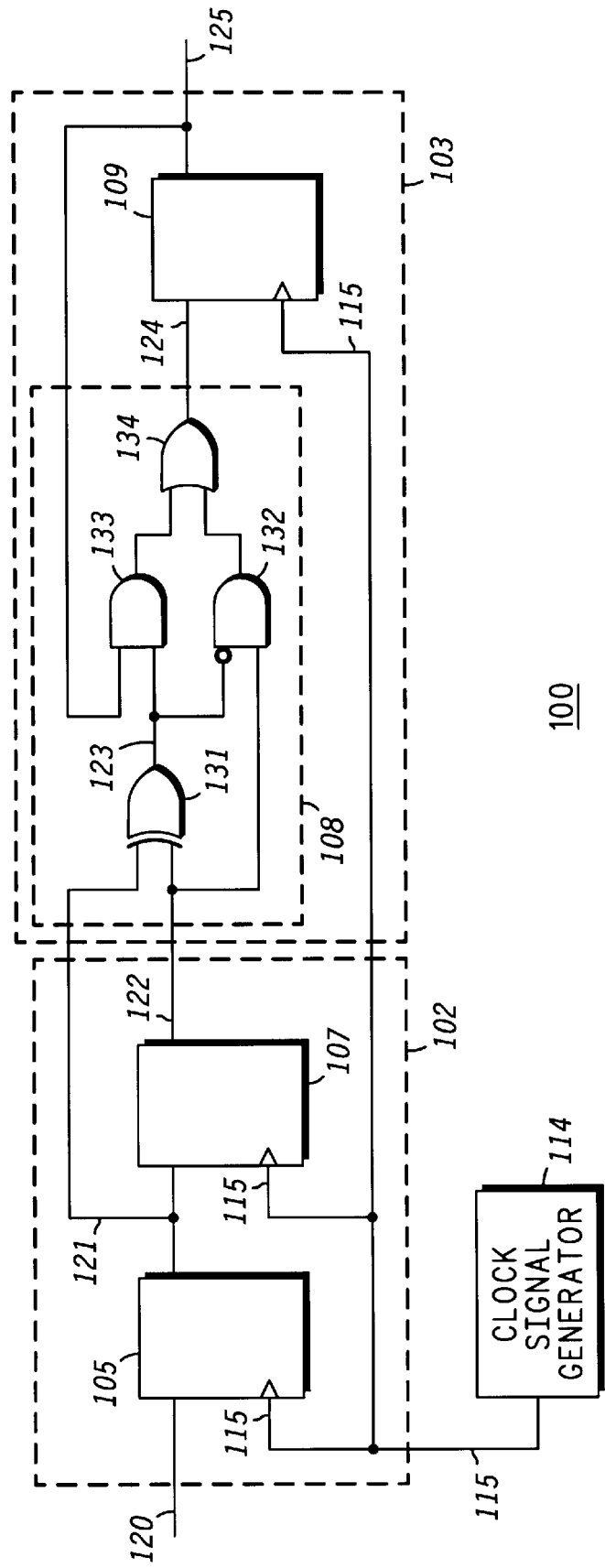
FIG. 1 illustrates a polarity detector in accordance with the preferred embodiment of the present invention.
Figure 6:
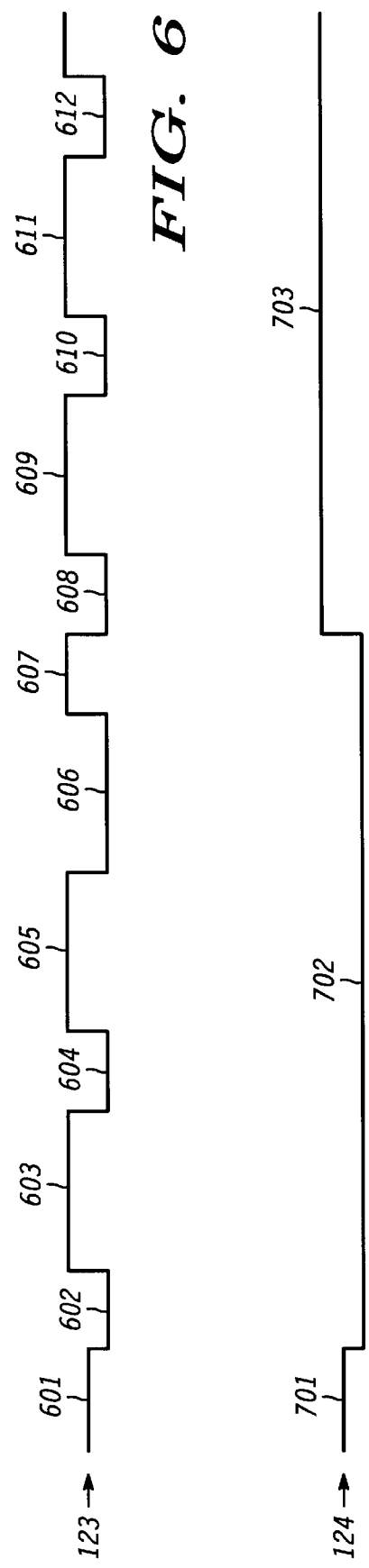
Figure 7:
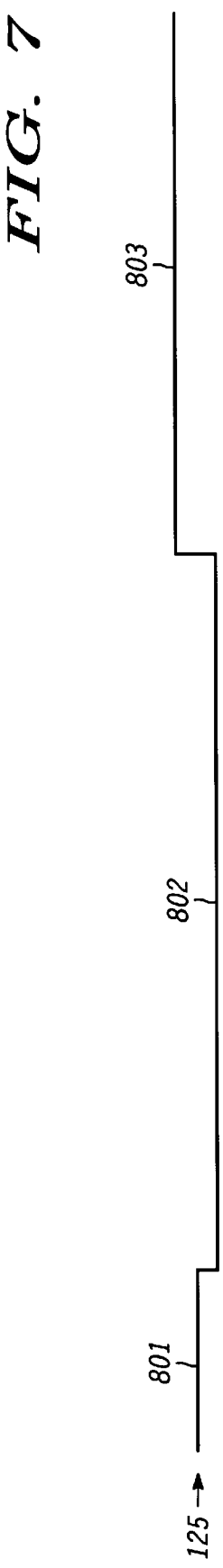
Figure 8:
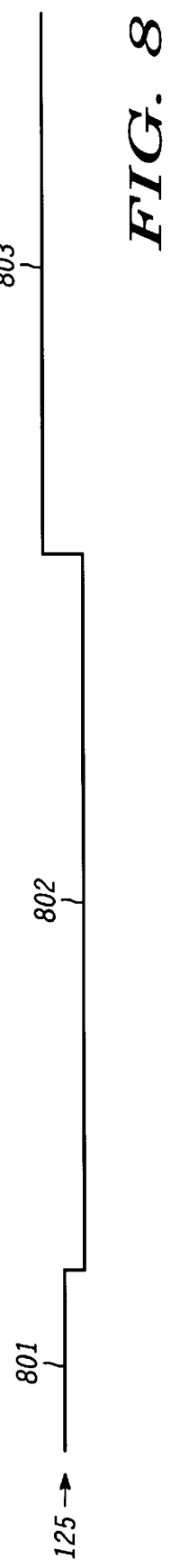

FIG. 1 illustrates a polarity detector 100 comprising a storage means 102 and a digital comparator 103. The storage means 102 comprises bistables 105 and 107, and the digital comparator 103 comprises a logic circuit 108 and a bistable 109. The bistable 105 is coupled to a clock signal generator 114 and a sequence of pulses 120. An output of the bistable 105 is coupled to the bistable 107 and to an input of an exclusive Or gate 131 of the logic circuit 108. The bistable 107 is coupled to receive the clock signal generator 114. An output of the bistable 107 is coupled to the other input of exclusive Or gate 131 and an input of an AND gate 132. An output of the exclusive OR gate 131 is coupled to the input of the AND 132, which is an inverting input, and to an input of an AND gate 133. Outputs of both AND gates 132 and 133 are coupled to inputs of an OR gate 134, which has an output coupled to an input of a bistable 109. An output of bistable 109 is coupled to the other input of the AND gate 133. The clock signal generator provides a clock signal 115 to a clock signal input of bistables 105, 107 and 109. Various signals in the polarity detector 100 are identified including; output signal 121 of the bistable 105; output signal 122 of the bistable 107; output signal 123 of the exclusive OR gate 131; output signal 124 of the OR gate 134; and output signal 125 of the bistable 109.

The clock signal 115 inputs to the bistables 105 and 107 effect the sampling, and storing of the samples, of the sequence of pulses 120. Samples are stored by the bistables 105 and 107, and are provided to the logic circuit 108 via output signals 121 and 122. The logic circuit 108 comprises the exclusive-OR gate 131 coupled to receive the output signal 121 from the bistable 105 and coupled to receive the output signal 122 from the bistable 107, and provides an output signal 123. The exclusive OR gate 131 compares the samples stored by the bistables 105 and 107, provides the output signal 123 having a logic 1 when the polarity of the stored samples are different, and provides the output signal 123 having a logic 0 when the polarity of the stored samples are identical. The output signal 123 is provided to a pair of AND gates 132 and 133, the outputs of which are transmitted to an OR gate 134 that provides on output signal 124 to an input of the bistable 109. The AND gate 133 is enabled when the polarity of the samples are not identical, while the AND gate 132 is enabled when the polarity of the samples is identical. When a logic 1 is applied to one of 2 inputs of a 2 input AND gate, the AND gate is enabled. This means that the enabled AND gate produces an output signal having the same logic as that provided to the other input of the AND gate i.e. the logic at the other input of the AND gate is gated through to the output of the AND gate. The bistable 109 receives the clock signal 115 and the output signal 124, and in response provides an output signal 125. The bistable 109 stores the output signal 125 for a minimum duration of one clock cycle of the clock signal 115. The AND gate 133 is also coupled to receive the output signal 125, and when the polarity of the samples are not identical and a clock pulse of the clock signal 115 occurs, the output signal 125, either logic 1 or logic 0, is gated through the AND gate 133, the OR gate 134, and then via the output signal 124, to the bistable 109. This causes the output signal 125 to remain in the same logic state as it was in, prior to the occurrence of the clock pulse i.e. the output signal remains unchanged. In addition, AND gate 132 is coupled to receive the output signal 122 and the output signal 123. The AND gate 132 inverts the output signal 123, thus, when the polarity of the stored samples are identical the AND gate 132 is enabled by an inverted output signal 123. Consequently, when the stored samples are identical and a clock pulse of the clock signal 115 occurs, the output signal 122 indicating the polarity of the stored pulses, either logic 1 or logic 0, is coupled through the AND gate 132, the OR gate 134, and then via the output signal 124, to the bistable 109. This causes the output signal 125 to have the polarity of the stored samples. The bistables 105, 107 and 109 are edge triggered D-type flip flops, however any functionally similar type of bistable, such as are known in the art can be used. The logic circuit 108 can comprise various other logic gates than those as described, however, it is understood that various combinations of logic gates may used to implement the same logic function as the logic circuit 108.

TABLE 1

| $Q_{1n}$ | $Q_{2n}$ | $F_{n+1}$ |
|---|---|---|
| 0 | 0 | 0 |
| 0 | 1 | Fn |
| 1 | 0 | Fn |
| 1 | 1 | 1 |

TABLE 1 above illustrates the logic function performed by the polarity detector 100, where Q1 and Q2 are the outputs of the bistables 105 and 107 respectively, representing the polarity of the samples, and F is the output signal 125. The notation n and n+1 indicates the clock pulse sequence. For example looking at the first row of TABLE 1, when clock pulse n occurs Q1 and Q2 are a logic 0, indicating the polarity of the samples are negative. Consequently, the output signal F is logic 0, indicating the polarity of the sequence of pulses is negative when a subsequent clock pulse, n+1 occurs. From the second and third row of TABLE 1, when the inputs Q1 and Q2 are not identical, where one is logic 0 and the other is logic 1, the output signal F is unchanged. This indicates that the no consistent change in the polarity of the sequence of pulses has been detected and consequently, the output signal F remains unchanged. From the fourth row, when Q1 and Q2 are a logic 1, then the output signal is 1. From TABLE 1, the polarity detector 100 of the present invention advantageously samples a sequence of pulses, and thereby provides an output signal indicative of the polarity of the sequence of pulses.

FIGS. 2 to 8 illustrate timing diagrams of various signals of the polarity detector 100 which may be referred to for a more detailed understanding of the operation of the polarity detector 100. On initialisation, the polarity detector 100 is activated and the sequence of pulses 120 is provided to the polarity detector 100. When the rising edge of clock pulse 301 occurs, it causes the bistable 105 to sample the pulse 201, having a logic 0 state, of the sequence of pulses 120. Consequently, the output signal 121 has a logic 0 state 401, and the output signals 122, 123, 124 and 125 have an indeterminate state 501, 601, 701 and 801, respectively. Note that an indeterminate state is not distinguishable by the logic circuitry of the polarity detector 100, as either a logic 1 or a logic 0. The occurrence of clock pulse 302 causes the output signal 121 to remain at the logic 0 state 401, and causes the outputs 122, 123 and 124 to change to a logic 0 state 502, 602, and 702, respectively. Consequently, as the output signal 124 provided to the bistable 109 is an indeterminate state when the clock pulse 302 occurs, the output signal 125 of the bistable 109 remains in the indeterminate state 801. When clock pulse 303 occurs, the bistable 105 samples pulse 202 having a logic 1 state, of the sequence of pulses 120, and the output signal 121 changes to a logic 1 state 402. Concurrently, the output signal 122 of the bistable 107 remains at the logic 0 state 502; the exclusive OR gate 131 receives the output signal 121 having the logic 1 state 402, and the output signal 122 having the logic 0 state 502 causing the output signal 123 to change to the logic 1 state 603; and the output signal 125 takes on the logic 0 state 802. After clock pulse 303 occurs, the initialisation of the polarity detector 100 is over, and the operation of the polarity detector the proceeds as illustrated by the timing diagrams of FIGS. 2 to 8.

Figure 9:
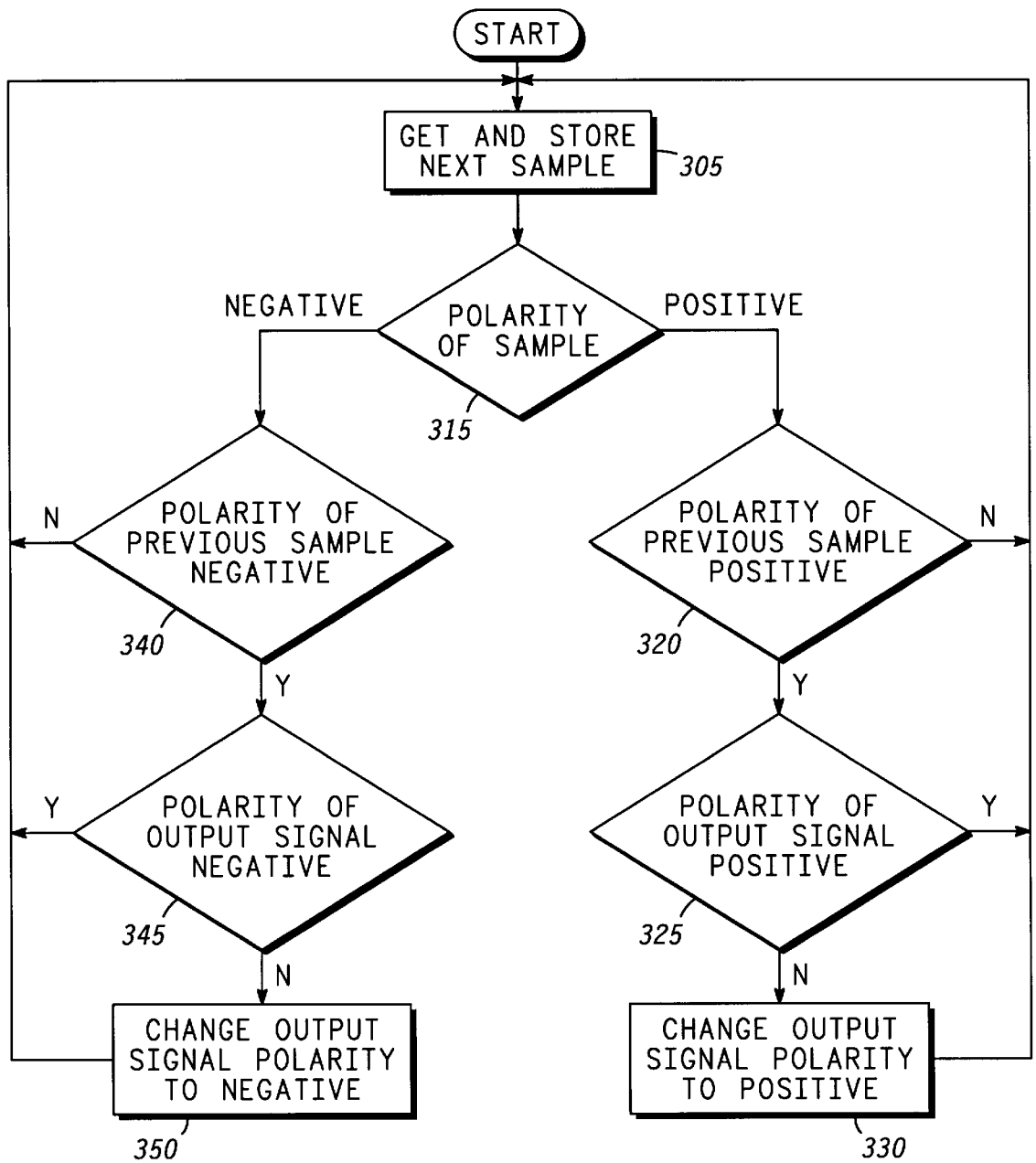
FIG. 9 illustrates a flowchart detailing the operation of the polarity detector in FIG. 1 in accordance with the preferred embodiment of the present invention.

FIG. 9 illustrates a flowchart detailing the operation of the polarity detector 100. Referring also to FIG. 1, the polarity detector 100 operates by getting and storing 305 a sample of the sequence of pulses 120. This is accomplished by the bistable 105 when it receives a clock pulse from the clock generator 114. The next step is determining 315 the polarity of the sample. In the preferred embodiment, the polarity of the sample is determined from the logic level which the sample represents, as was defined above. When the polarity of the sample is positive, a further determination 320 is made as to whether the polarity of the sample is identical to the polarity of a previous sample. When the polarity of the samples are not identical, then there is no change to the output signal 125 of the polarity detector 100. When the polarity of the samples are identical, then a further determination 325 is made as to whether the positive polarity of the samples is identical to the polarity of the output signal 125 of the polarity detector 100. When the polarity of the output signal 125 of the polarity detector 100 is not identical to the polarity of the samples, then the polarity of the output signal 125 is changed 330 to the polarity of the stored samples. However, when the polarity of the output signal 125 is identical to the polarity of the samples then no change is made to the output signal, and the polarity detector 100 returns to getting the next sample. A similar operation as described above occurs when the polarity detector 100 gets a sample having negative polarity.

In accordance with the present invention a polarity detector is provided using digital circuitry for detecting the polarity of a sequence of pulses. This is achieved using bistables to sample, and store the samples, of the sequence of pulses. Then, using logic circuitry to compare the polarity of the samples, and further comparing the polarity of the samples with the polarity of the output signal, a determination can be made as to whether the output signal indicates the polarity of the samples, and the polarity of the output signal can then be changed to indicate the polarity of the samples. Hence, the output signal advantageously indicates the polarity of the sequence of pulses. Further, because the present invention can be easily implemented in digital circuitry, it can be advantageously integrated with a controller on a single semiconductor chip for use in a computer monitor, thereby providing a single package solution. This is more easily designed by manufacturers of computer monitors into their products. Further, the single package allows easier assembly resulting in costs savings, and the reduction in the number of components improves reliability of the computer monitor.

Hence, a polarity detector in accordance with the present invention detects the polarity of vertical and horizontal synchronising pulses in a computer monitor without the need for resistors and capacitors, does not require complex arrangements of counters and comparators, and can be integrated with a computer monitor controller in a single chip, without negatively affecting the complexity, performance and cost of the controller chip.

What is claimed is:

1. A polarity detector comprising:

a storage means for selectively sampling and storing a sequence of 2 pulses; and a digital comparator means coupled to outputs of the storage means to compare the samples to provide an output signal, wherein, in use, changes in the output signal are dependent upon the polarity of the output signal and the polarity of the samples being identical, and wherein when the samples differ in polarity the output signal remains unchanged.

2. The polarity detector of claim 1, wherein the storage means has a clock input for effecting the storing.

3. The polarity detector of claim 1, wherein the storage means comprises two bistables.

4. The polarity detector of claim 2, wherein the digital comparator comprises an output signal storage means for storing the output signal, the output signal storage means being coupled to the clock input of the storage means for effecting storage of the output signal upon receipt of a clock pulse.

5. The polarity detector of claim 4, wherein the digital comparator comprises a logic circuit adapted to receive the stored output signal for comparing the samples therewith.

6. A method for detecting polarity of a sequence of pulses, the method comprising the steps of:

a) selectively sampling and storing samples of the pulses; and b) comparing the samples to provide an output signal indicative of the samples being identical in polarity.

7. The method of claim 6, wherein the step of selectively sampling and storing (a) is effected by a clock signal.

8. The method of claim 7, wherein the step of comparing (b) further comprises the step of storing the output signal for one cycle of the clock signal.

9. The method of claim 6, wherein the step of comparing (b) further comprises the step of comparing the samples and the output signal.

* * * * *